United States Patent [19]

Georgiou

[11] Patent Number: 4,605,928

[45] Date of Patent: Aug. 12, 1986

[54] FAULT-TOLERANT ARRAY OF CROSS-POINT SWITCHING MATRICES

[75] Inventor: Christos J. Georgiou, White Plains, N.Y.

[73] Assignee: International Business Machines Corporation, Armonk, N.Y.

[21] Appl. No.: 544,652

[22] Filed: Oct. 24, 1983

[51] Int. Cl.[4] .............................................. H04Q 1/00
[52] U.S. Cl. ........................... 340/825.94; 179/18 GF
[58] Field of Search .......... 340/825.94, 825.8, 825.86, 340/825.22, 825.92; 370/16, 54, 58, 63, 67; 179/18 EA, 18 ES, 18 GF, 18 J; 371/8

[56] References Cited

U.S. PATENT DOCUMENTS

| | | | |
|---|---|---|---|
| 3,321,745 | 5/1967 | Mansuetto et al. | ............. 340/825.86 |
| 4,144,407 | 3/1979 | Zaffignani | ..................... 179/18 ES |
| 4,146,749 | 3/1979 | Pepping et al. | . |
| 4,162,535 | 7/1979 | Anderson | ...................... 179/18 GF |
| 4,331,956 | 5/1982 | Anderson | .............................. 370/67 |
| 4,345,251 | 8/1982 | Begeman et al. | .............. 340/825.86 |
| 4,393,381 | 7/1983 | Seiden | ............................ 340/825.83 |
| 4,412,102 | 10/1983 | Ogawa et al. | ................... 179/18 GF |
| 4,417,245 | 11/1983 | Melhs et al. | ....................... 340/825.8 |

Primary Examiner—Donald J. Yusko
Attorney, Agent, or Firm—Sughrue, Mion, Zinn, Macpeak and Seas

[57] ABSTRACT

A cross-point switch comprising an array of cross-point matrices 60, 62, 64, 65 in which the internal lines 22-32 are connected to external lines 45-54 by tri-state buffers 36-44. The external lines can connect different switching matrices. Redundant matrices may be included to provide fault tolerance.

12 Claims, 3 Drawing Figures

FAULT-TOLERANT ARRAY OF CROSS-POINT SWITCHING MATRICES

BACKGROUND OF THE INVENTION

The invention relates generally to cross-point switches and in particular to arrays of cross-point switching arrays allowing for fault tolerance.

A cross-point switch provides for switching between various data lines. An example of a cross-point switch is given in FIG. 1, in which eight input lines $A_0$–$A_7$ can each be selectively coupled to one of eight output lines $B_0$–$B_7$. Here the input lines are connected to horizontal conduction paths and the output lines are connected to vertical conduction paths. At each intersection of a row and column there is placed a control switch, for instance switch 12, between the input line $A_0$ and the output line $B_1$. The switch 12 may be a thyristor, a transistor or a gate. It may be controlled either by external control signals or by special waveforms applied to the input and output lines. Once the switch 12 has been activated, the input line $A_0$ is connected to the output line $B_1$ by a low impedance path. Any switch which has not been turned on presents a high impedance and accordingly does not connect the row and column to which it is attached. The intersection between a row and column is called a cross-point and the switch at the cross-point is therefore referred to as a cross-point switch.

In FIG. 1, the cross-point switches are represented as diodes with the implication that data flow over the input and output lines occurs only in one direction, i.e. data flows from the input lines $A_0$–$A_7$ to the output lines $B_0$–$B_7$ and not in the opposite direction. However, it is possible to have bi-directional cross-point switches which allow data flow in both directions. Such a bi-directional switch can be represented as a pair of anti-parallel diodes, though it is to be understood that other types of switches can be used.

The switch represented in FIG. 1 is known as a two-sided switch. This means that lines on one side, e.g. $A_0$–$A_7$, are connected to lines on another side of the switch, e.g. $B_0$–$B_7$. Another type of switch is the one-sided switch in which the columns, $B_0$–$B_7$ are not necessarily connected to external lines but serve only, in the simplest case, for internal connection. The one-sided switch serves to interconnect the lines on one side of the switch $A_0$–$A_7$ to each other. This is accomplished by using one of the columns as an interconnecting line. For instance, the lines $A_0$ and $A_2$ can be interconnected by turning on bi-directional switches 12 and 14. With these switches activated, column $B_1$ serves as an interconnecting line between rows $A_0$ and $A_2$. It is to be appreciated that any of the columns can be used for such an interconnection and therefore rather than activating switches 12 and 14, other similar pairs such as switches 16 and 18 can be activated with the same effect.

For simplicity, it will be assumed that one line is connected to only one other line. It is to therefore be appreciated that if complete connectivity is to be attained between the eight lines $A_0$–$A_7$, then only four columns, for instance, $B_0$–$B_3$, are needed to provide the interconnection because one column is connected to two rows. This is known as a non-blocking configuration because no previously made connection blocks a subsequent connection.

Cross-point switches have a long history in the telephone industry. Until recently, the cross-points were provided by electro-mechanical switches. More recently, the switching array of FIG. 1 has been realized in integrated semiconductor form. Because of the miniaturization available in semiconductor integration, many more lines can be interconnected in a reasonably sized cross-point switch. However, it is obvious that as the number n of lines increases, the number of cross-points increases approximately as $n^2$. For one-sided switches, this dependence is more precisely $n^2/2$. Thus, an eight-line one-sided cross-point switch requires 32 cross-points, a number very easily attainable, even in MSI level integrated circuits. But because of the geometric dependence, if 1,024 lines are desired to be interconnected, a total of 524,288 cross-points are required. This size array is very difficult to obtain in integrated circuit fabrication.

One method of reducing the size of the cross-point switching array is to divide the switch into cascaded sections such as described by Mansuetto et al. in U.S. Pat. No. 3,321,745. The first section is composed of smaller switching arrays, the outputs of which are separately connected to different secondary switching arrays. A refinement of this switching system is the subject of a U.S. patent application, Ser. No. 298,705, filed Sept. 2, 1981, by Melas et al and now issued as U.S. Pat. No. 4,417,245. In this system, the individual switches are square arrays and are cascaded into three sections. This system suffers several drawbacks. The inter-array wiring is irregular, the configuration requires that some lines are input lines, others are output lines and the configuration is blocking in some situations. Another type of three-section switch is the CLOS configuration. While this system is similar to that of Melas et al., it can be made non-blocking but at the expense of larger and non-square switching arrays.

An important consideration in cross-point switches and in semiconductor ICs in general is reliability. There is a seemingly unavoidable probability that one of the cross-points will fail. If one of the cross-points fails in an open position, i.e. it is stuck in a high impedance state, then full connectivity of the simple network cannot be assured because the failed cross-point will block the final connection. An open fail can however be compensated by providing one for or more extra columns so that if one cross-point is unavailable, then an operable substitute is always available. However, if the cross-point fails in the closed position, i.e. the cross-point is shorted, then a simple redundancy does not provide fault tolerance because the column and row connected by the cross-point are always connected.

The telephone industry has emphasized reliablity of their switching networks and many fault tolerant systems have been described. For instance, Pepping et al. in U.S. Pat. No. 4,146,749 describe a switching system in which a spare block of multiplexers/demultiplexers is included at the system level to assume duties of any of four blocks that has failed. Zaffignani et al. in U.S. Pat. No. 4,144,407 describe a switching system in which every component has a back-up. Mansuetto et al., referred to above, describe a fault-tolerant cross-point switch in which additional diodes are provided during fabrication. During the wiring phase, any failed diode can simply be avoided, with complete connection nonetheless possible. However, this is a static allocation scheme and does not provide tolerance for faults which develop during operation. Such post-assembly faults require dynamic allocation for convenient fault tolerance.

SUMMARY OF THE INVENTION

Accordingly, an object of the invention is to provide a cross-point switch having components of convenient size for semiconductor integration.

Another object of the invention is to provide a cross-point switch having fault tolerance.

The invention is a cross-point switch comprising an array of cross-point switching matrices, each of convenient size. The individual matrices are connected to another plane of lines for interconnecting the matrices and are isolated from this plane by tri-state buffers. Furthermore, additional lines are provided which provide back-up switching arrays if one array fails and needs to be isolated by its tri-state buffer.

DETAILED DESCRIPTION OF THE EMBODIMENTS

Figure 1:
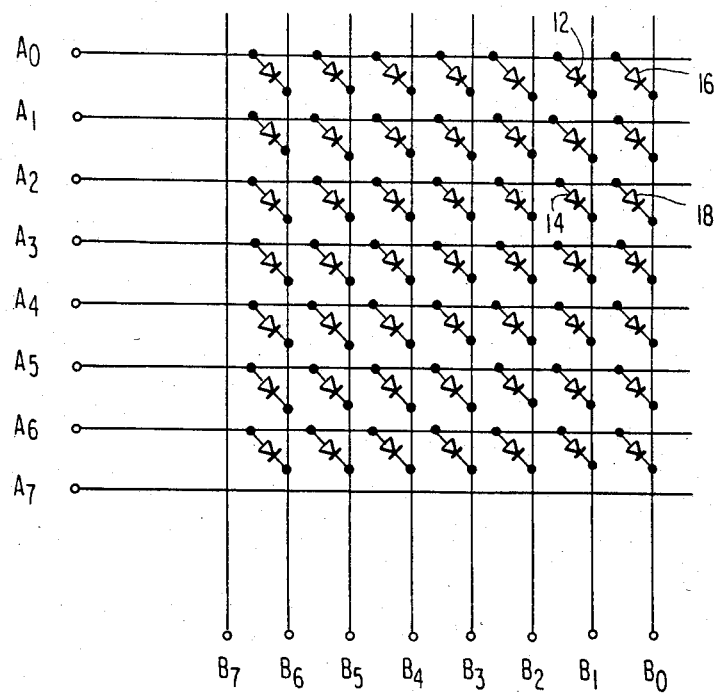
FIG. 1 is a schematic diagram of a conventional switching matrix.
Figure 2:
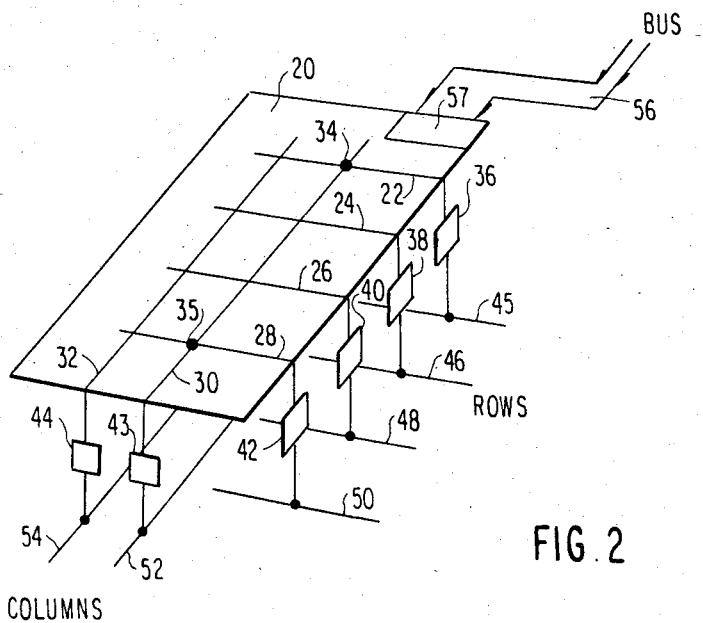
FIG. 2 is a switching matrix with tri-state buffers and a second level interconnection.

In FIG. 2 is shown one switching matrix as is usable with the practice of this invention. The example shows a 4×2 switching matrix which would be used particularly for a one-sided switch. On the switching network 20 of the switch are located four horizontal rows 22, 24, 26 and 28 and two vertical columns 30 and 32. At the intersection of each row and column is located a controllable switch, for instance 34 and 35. The switch in its activated state provides a bi-directional low conductivity path between the row and column to which the switch or cross-point is connected. Each row is connected to its respective tri-state buffer 36, 38, 40 or 42, and similarly each column is connected to its respective tri-state buffer 43 or 44. A tri-state buffer in this context is a buffer or gate which in its inactivated state presents a high impedance between its two ports. However, in its activated state, it will transmit a signal applied to one port to the other port. If this is a digital network, the signal transmitted will be either high or low. An example of a bi-directional tri-state buffer is a pair of switchable diodes, connected in parallel but with opposite polarities. When they are turned off, each presents a high impedance in both directions. However, when they are turned on, one of them passes a signal in each direction. However, when they are turned on, one of them passes a signal in each direction. The tri-state buffers 36-42 connected to the rows of the switching network 20 are also connected to respective rows 45, 46, 48 and 50 of a second interconnection matrix. One example would be a pattern of interconnections on a printed circuit board or ceramic carrier. The tri-state buffers 43 and 44 which are connected to the columns of the switching network 20 are connected as well to the corresponding columns 52 and 54 of the secondary interconnection matrix. It is therefore seen that if one of the cross-points 34 fails, this failure can be isolated from the secondary matrix if the tri-state buffers 36 and 43 are kept in the inactivated state.

If the rows 45 and 50 are to be interconnected, it is required to not only turn on the cross-points 34 and 35 but to also activate the tri-state buffers 36 and 43. This is accomplished by means of a control bus 56 that originates from a controller and is connected to an on-chip controller 57. The on-chip controller 57 is also connected to each of the cross-points to each of the tri-state buffers 36-44. The on-chip controller 57 receives a signal from the control bus 56 and, based on that signal, switches (either on or off, depending on the signal), one cross-point and possibly its associated buffers. Storage elements within the on-chip controller corresponding to each cross-point allow a cross-point to stay switched after the signal on the control bus is removed. The columns 52 and 54 on the secondary interconnection level and their associated tri-state buffers 43 and 44 are not required if the interconnection is to be performed between rows attached to the same switching matrix. However, as will be described later, these will be used if a row connected to one switching matrix is to be connected with a row on another switching matrix.

Figure 3:
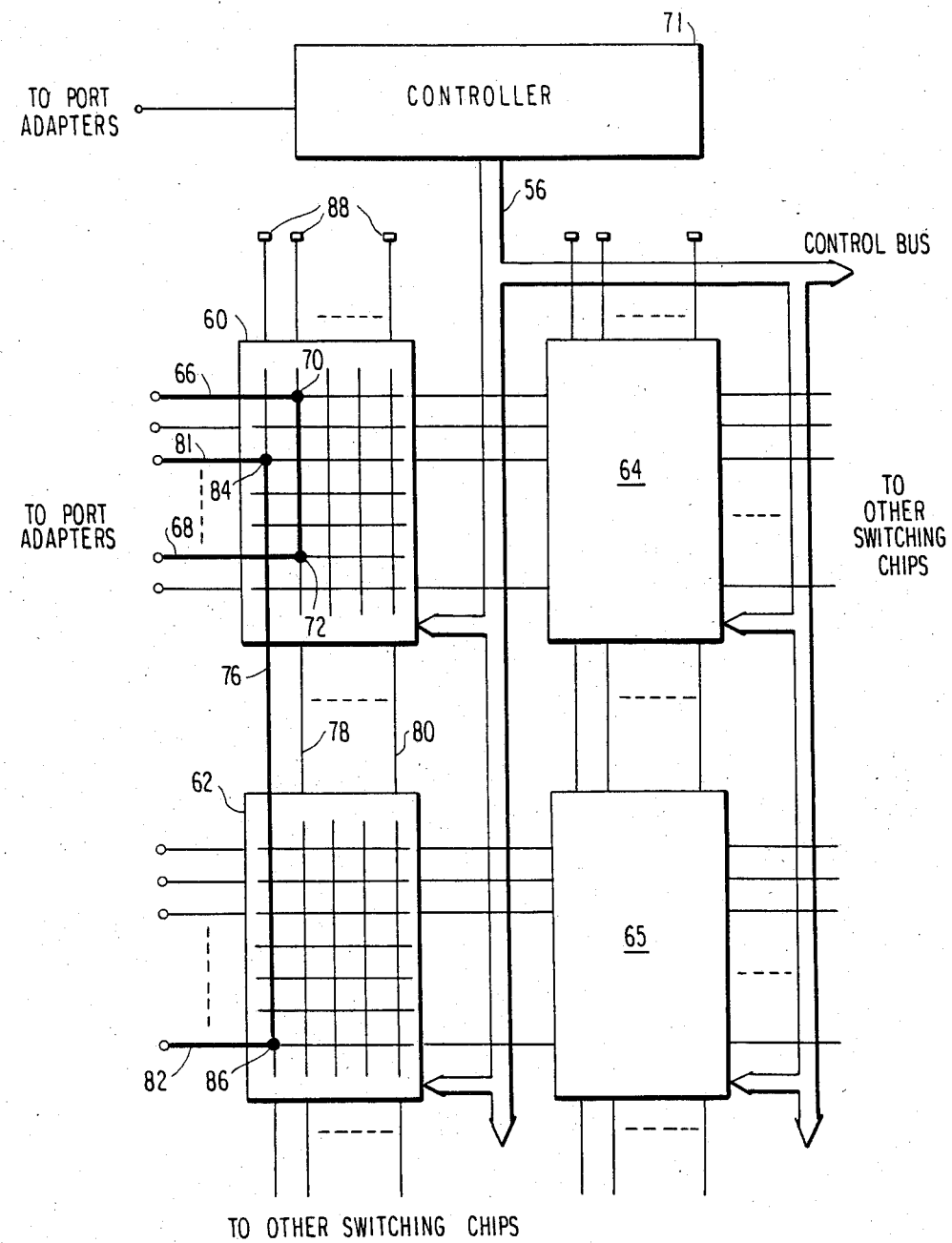
FIG. 3 is a block diagram of the switching network of this invention.

FIG. 3 illustrates an array of switching matrices 60, 62, 64 and 65. Each of these switching matrices comprises the switching network 20 and its associated tri-state buffers 36-46. The data lines enter from the left and each line is connected to the respective row of the switching matrix by a tri-state buffer. If lines 66 and 68 are to be interconnected, then cross-points 70 and 72 are turned on as well as the tri-state buffers associated with those rows. All this is performed under the control of the controller 71 linked to the matrices by the control bus 56.

In a co-pending application, Ser. No. 544,653, filed on Oct. 24, 1983, and incorporated herein by reference, I describe the structure and operation of a controller useful for controlling the switching array of this invention, particularly in high-speed computer applications. Anderson describes another controller for a solid state cross-point switch in U.S. Pat. No. 4,331,956.

If there are more lines than can be accommodated in a single switching matrix 60, then another switching matrix 62 is included. This switching matrix has its own data lines but is connected to the columns 76, 78 and 80 to which the other matrix 60 is connected. If then lines 81 and 82 are to be interconnected, switch points 84 and 86 are turned on as well as their respective row and column tri-state buffers so that column 76 interconnects the two switching matrices 60 and 62, thereby effecting the connection. It is to be noted that the columns on the secondary interconnection array are themselves inactive. At most they have a termination 88 at their ends.

Additional switching matrices 64 and 65 may also be connected to the same rows on the secondary array as the previously described matrices 60 and 62. These additional arrays may be required to provide full connectivity between the data lines. That is, for a one-sided switch with n lines or n rows, it is required that there be n/2 columns. Only with this number of columns will the system be non-blocking so that there will always be cross-points available if all the lines are being used. However, even if the necessary number of columns are already available, it may be desirable to add additional switching matrices to the rows to provide redundancy and thus fault tolerance to the switching system. For example, if the switching array 60 fails because of bad cross-points or possibly for other reasons, it may be isolated from the second level of interconnection by its tri-state buffers. In that case, an extra array 64 can provide the connectivity that has been lost from the failed switching array 60. The degree of duplication of the switching arrays thus depends not only on the size of the switching arrays and the number of lines but also upon the desired data bandwidth (connectivity) and fault tolerance of the system.

It is to be appreciated that if multiple matrices are already included on the rows, neglecting fault tolerance, that the failure of a single array can be masked by selecting only those columns which avoid the failed array. However, complete connectivity may be lost and therefore bandwidth of the system lowered (the system becomes blocking because not all of the lines can be simultaneously connected. The use of additional matrices on the rows provides fault tolerance. Multiple redundant matrices assures higher reliability of a non-blocking system in the case of multiple failures.

The invention as described above provides a high speed and flexible switch which can be made to be reliable and fault tolerant. It can also be used to implement a large scale switch from smaller, more economical components.

Having thus described our invention, what we claim as new, and desire to secure by Letters Patent is:

1. A switching network, comprising:
   a plurality of cross-point switching matrices (60,62,64,65), each comprising a plurality of first internal lines (22–28), a plurality of second internal lines (30,32) perpendicular to said first internal lines and switch points (34,35) between said first internal lines and said second internal lines at each intersection of a first internal line with a second internal line; and
   an array of first external lines (45–50) and of second external lines (52, 54), each first external line being associated with a first internal line on plurality of said switching matrices and each second external line being associated with a second internal line on a plurality of said switching matrices;
   wherein said cross-points are selectively activatable in pairs for interconnecting any two of said first external lines for communication therebetween through only one of said second internal lines, if said any two first external lines are associated with the same switching matrix, or through two of said second internal lines and only one of said second external lines, if said any two first external lines are not associated with the same switching matrix; and
   wherein any pair of first external lines are connectable by activating a pair of cross-points on any of a plurality of switching matrices if said pair of first external lines are associated with first internal lines of the same plurality of switching matrices, or by activating a cross-point on each of a selected pair of switching matrices, said pair of switching matrices being any pair of a plurality of pairs of switching matrices, if said pair of first external lines are associated with first internal lines of different pluralities of switching matrices, said selected pair of switching matrices being connected to a same second external line.

2. A switching network, as recited in claim 1, further comprising means (36–44) for selectively interconnecting each of said internal lines to its associated external line.

3. A switching network, as recited in claim 2, wherein said selective interconnecting means are selectively activated bi-directional gates.

4. A switching network, as recited in claim 2, wherein said first external lines comprise input-output lines (45–50) and said second external lines comprise interconnect lines (52, 54), and said cross-point matrices are bi-directional two-sided cross-point matrices and allow one-sided connections among said first internal lines.

5. A switching network, as recited in claim 4, further comprising a controller (71) and a control bus (56) connected between said controller and said matrices for controlling said switch points and said interconnecting means.

6. A switching network, as recited in claim 4, wherein said plurality of switching matrices comprises redundant matrices associated with said input-output lines above the number required for a non-blocking switching network, said redundant matrices allowing operation of said switching network with a failed switching matrix.

7. A switching network, as recited in claim 1, wherein said first external lines comprise input-output lines (45–50) and said second external lines comprise interconnect lines (52, 54), and said cross-point matrices are bi-directional two-sided cross-point matrices and allow one-sided connections among said first internal lines.

8. A switching network, as recited in claim 7, further comprising a controller (71) and a control bus (56) connected between said controller and said matrices for controlling said switch points and said interconnecting means.

9. A switching network, as recited in claim 7, wherein said plurality of switching matrices comprises redundant matrices associated with said input-output lines above the number required for a non-blocking switching network.

10. A switching network as recited in claim 7, wherein the number of second external lines exceeds one-half the number of input-output lines.

11. A switching network, as recited in claim 1, further comprising a controller (71) and a control bus (56) connected between said controller and said matrices for controlling said switch points and said interconnecting means.

12. A switching network as recited in claim 1, wherein the number of second external lines is at least equal to one-half the number of first external lines.

* * * * *